(12) United States Patent
Gottlieb et al.

(10) Patent No.: US 10,557,732 B2
(45) Date of Patent: Feb. 11, 2020

(54) FLOWMETERS AND METHODS OF MANUFACTURE

(71) Applicant: Cameron International Corporation, Houston, TX (US)

(72) Inventors: Emanuel John Gottlieb, Upper Saint Clair, PA (US); Gopalakrishna Srinivasamurthy Magadi, The Woodlands, TX (US)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 15/835,097

(22) Filed: Dec. 7, 2017

(65) Prior Publication Data

US 2019/0178691 A1    Jun. 13, 2019

(51) Int. Cl.
   *G01F 1/66* (2006.01)

(52) U.S. Cl.
   CPC .................................. *G01F 1/662* (2013.01)

(58) Field of Classification Search
   CPC ........................................................ G01F 1/66
   See application file for complete search history.

(56) References Cited

U.S. PATENT DOCUMENTS

| | | | |
|---|---|---|---|
| 3,367,359 A | 2/1968 | Johnson | |
| 3,484,079 A | 12/1969 | Reagan | |
| 3,518,742 A | 7/1970 | Merrill et al. | |
| 3,737,145 A | 6/1973 | Heller et al. | |
| 3,825,030 A | 7/1974 | Kalsi | |
| 4,150,810 A | 4/1979 | Laignel et al. | |
| 5,236,176 A | 8/1993 | Yeh | |
| 5,680,889 A | 10/1997 | Boger | |
| 6,895,824 B2 | 5/2005 | Ehrlich et al. | |
| 6,974,116 B1 | 12/2005 | Christenson et al. | |
| 7,044,436 B2 | 5/2006 | Corbetta et al. | |
| 8,210,211 B2 | 7/2012 | McMasters et al. | |
| 8,544,343 B2 * | 10/2013 | Gottlieb | G01F 1/662 73/861.28 |
| 8,621,936 B2 | 1/2014 | McDonald et al. | |
| 8,904,861 B2 * | 12/2014 | Berger | G01F 1/662 73/426 |
| 8,960,017 B2 | 2/2015 | Schwarz | |
| 9,097,567 B2 * | 8/2015 | Wiest | G01F 1/66 |
| 9,335,193 B2 | 5/2016 | Wiest et al. | |
| 9,453,749 B1 | 9/2016 | Bachmann et al. | |

(Continued)

FOREIGN PATENT DOCUMENTS

CN    205691177 U    11/2016
WO    2013187936    12/2013

OTHER PUBLICATIONS

PCT International Search Report and Written Opinion; Application No. PCT/US2018/063872; dated Mar. 25, 2019; 16 pages.

*Primary Examiner* — Jewel V Dowtin
(74) *Attorney, Agent, or Firm* — Foley & Lardner LLP

(57) ABSTRACT

A flowmeter body assembly includes a flowmeter body defining a central bore and a plurality of angled connectors extending from a sidewall of the flowmeter body. The flowmeter body and the plurality of angled connectors form a one-piece structure that is devoid of welded joints, and each of the plurality of angled connectors is configured to support a respective sensor to enable measurement of a flow rate of a fluid across at least one chordal plane of the flowmeter body.

20 Claims, 12 Drawing Sheets

(56) References Cited

U.S. PATENT DOCUMENTS

| | | | |
|---|---|---|---|
| 9,689,727 B2* | 6/2017 | Kissling | G01F 1/662 |
| 2003/0084732 A1 | 5/2003 | Ehrlich et al. | |
| 2013/0098167 A1 | 4/2013 | McDonald et al. | |
| 2014/0130606 A1 | 5/2014 | Schwarz | |
| 2015/0000422 A1 | 1/2015 | Wiest et al. | |
| 2015/0204704 A1* | 7/2015 | Wiest | G01F 1/662 |
| | | | 73/861.28 |
| 2016/0061381 A1 | 3/2016 | Kotliar | |
| 2016/0265954 A1 | 9/2016 | Bachmann et al. | |
| 2016/0346626 A1 | 12/2016 | Nurberg et al. | |
| 2017/0074698 A1* | 3/2017 | Teufel | G01P 5/001 |
| 2017/0102089 A1 | 4/2017 | Griffin, Jr. et al. | |
| 2017/0328152 A1* | 11/2017 | Jaffrey | E21B 21/08 |

* cited by examiner

FLOWMETERS AND METHODS OF MANUFACTURE

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Flowmeters may be used to measure a flow rate of a fluid. For example, in mineral extraction systems or pipeline systems, a conduit may be used to support a fluid, and a flowmeter may be used to measure a flow rate of the fluid through the conduit. The configuration of the flowmeter can impact the ability of the flowmeter to accurately measure the flow rate of the fluid, and can also impact durability of the flowmeter and installation processes for the flowmeter. Therefore, it would be desirable to improve the configuration of flowmeters.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION OF SPECIFIC EMBODIMENTS

Figure 1:
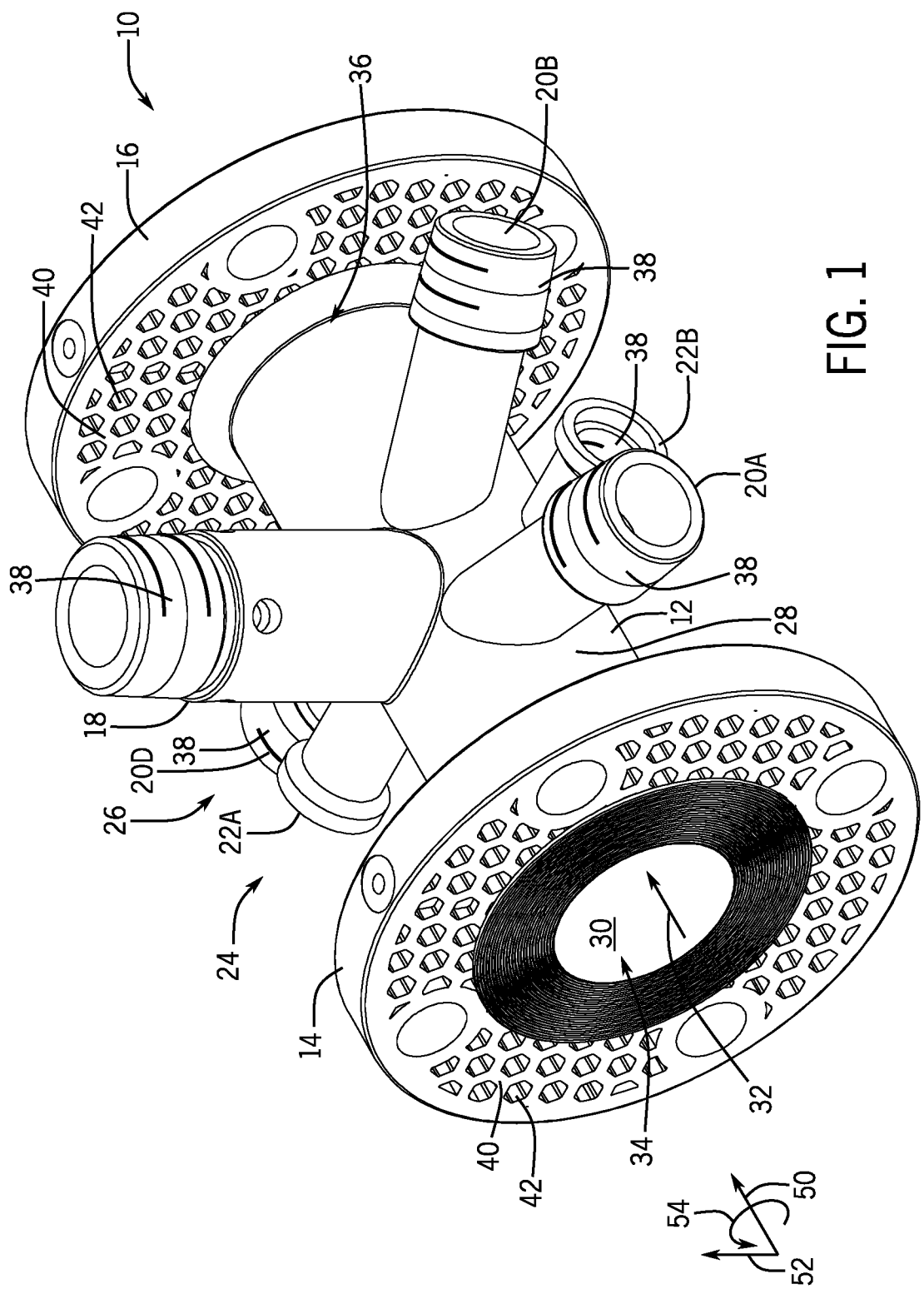
FIG. 1 is a perspective view of a flowmeter body assembly, in accordance with an embodiment of the present disclosure.

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Certain systems, such as mineral extraction systems (e.g., drilling and production systems) or pipeline systems, may include various fluid-handling components (e.g., conduits, tanks, injectors). For example, a conduit may direct a flow of a fluid (e.g., water, chemicals, gas, liquid, production fluid, drilling fluid) from one location to another location. A flowmeter may be provided to monitor a flow rate of the fluid through the conduit.

Some flowmeters may include a flowmeter body that is formed by machining a solid structure (e.g., metal block) into a generally cylindrical conduit having a central bore, which is aligned with adjacent conduits to enable the flow of fluid across the flowmeter. Some flowmeters may include a connector (e.g., annular connector) that extends radially from the flowmeter body and that is configured to support a measurement device (e.g., transmitter or a flow sensor). The connector may be machined separately and then welded to a sidewall of the flowmeter body. Furthermore, some flowmeters may include flanges at ends of the flowmeter body to facilitate coupling the flowmeter to the adjacent conduits. The flanges may also be machined separately and then welded to the flowmeter body.

In some cases, it may be desirable to form the flowmeter, the connector, and/or the flanges from high strength materials, such as a nickel-based alloy (e.g., Inconel 718) or a stainless steel material (e.g., martensitic precipitation hardened stainless steel, such as 17-4 PH). However, such materials may be difficult to properly or efficiently weld without local failures (e.g., cracking). Accordingly, the manufacturing process may be lengthy and complex, and the flowmeters produced via welding processes may be frequently identified as noncompliant with regulatory standards during testing and final inspections. Furthermore, the use of additional connectors to support multiple sensors (e.g., ultrasonic sensors or other flow sensors) may be inappropriate due to limited space about the flowmeter body to support additional separate welded joints, as well as due to the increased risk of local failures and noncompliant flowmeters from the additional welded joints. Furthermore, the flowmeter may be a solid, heavy component, which in turn, may make transport, installation, and maintenance of the flowmeter challenging.

Accordingly, certain disclosed embodiments relate to flowmeters having a flowmeter body assembly with a flowmeter body, a connector configured to support a measurement device (e.g., transmitter having an electronic controller), and additional connectors configured to support multiple sensors (e.g., ultrasonic sensors) to facilitate accurate measurement of the flow rate of the fluid. Some or all of the flowmeter body, the connector, and the additional connectors may be formed as a one-piece structure without welded joints. Additionally or alternatively, flanges of the flowmeter body assembly may be formed with a lattice structure (e.g., open cell structure, non-solid structure, non-continuous structure, or framework). For example, the lattice structure may include through holes that extend between opposed axially-facing surfaces of the flange. The lattice structure may reduce the weight of the flowmeter (e.g., as compared to flowmeters having solid flanges manufactured via traditional techniques), thereby facilitating transport, installation, and/or maintenance of the flowmeter. For example, in some embodiments, a flange having a lattice structure may weigh at least 10, 20, 30, 40, or 50 percent less than the flange without the lattice structure (e.g., solid flange).

In certain embodiments, the flowmeter body assembly may be manufactured via additive manufacturing techniques. Such techniques may enable construction of the flowmeter body assembly from computer models, without difficult machining steps. In general, additive manufacturing techniques involve applying a source of energy, such as a laser or electron beam, to deposited feedstock (e.g., powder or wire) in order to grow a part having a particular shape and features. The flowmeter disclosed herein may be utilized as part of any suitable fluid-handling system, such as an energy-acquisition or processing system (e.g., a hydrocarbon-production or processing system, such as a subsea or surface oil or gas well, a pipeline, a natural-gas processing terminal, a refinery, or a natural-gas powered electrical plant).

Turning now to the figures, FIG. 1 is a perspective view of a flowmeter body assembly 10, in accordance with an embodiment. The flowmeter body assembly 10 includes a flowmeter body 12 (e.g., main or primary annular conduit), an upstream flange 14 (e.g., annular flange), a downstream flange 16 (e.g., annular flange), and a connector 18 (e.g., main or primary annular connector). The flowmeter body assembly 10 may also include additional connectors, such as one or more angled connectors 20 (e.g., annular connectors) and one or more radial connectors 22 (e.g., annular connectors).

The connector 18 may be configured to support a measurement device (e.g., a transmitter having an electronic controller). Furthermore, each of the one or more angled connectors 20 may be configured to support an ultrasonic sensor (e.g., transceiver) that is configured to emit and to detect ultrasonic waves (e.g., acoustic waves), and each of the one or more radial connectors 22 may be configured to support a reflector (e.g., flat reflector) that is configured to reflect the ultrasonic waves emitted by the ultrasonic sensors.

As discussed in more detail below, the additional connectors may be arranged to facilitate measurements (e.g., ultrasonic measurements) across two different planes (e.g. chordal planes) of the flowmeter body 12. For example, a first angled connector 20A, a second angled connector 20B, and a first radial connector 22A may form a first connector assembly 24 that measures fluid flow in a first chordal plane, and a third angled connector 20C (shown in FIG. 2), a fourth angled connector 20D, and a second radial connector 22B may form a second connector assembly 26 that measures fluid flow in a second chordal plane. The connectors 18, 20, 22 may extend from a sidewall 28 (e.g., annular wall) of the flowmeter body 12.

As shown, the flowmeter body 12 defines a bore 30 (e.g., central bore), which may be aligned with respective bores of adjacent conduits (e.g., pipe sections) when the flowmeter body assembly 10 is coupled to the adjacent conduits via the flanges 14, 16. In the illustrated embodiment, the upstream flange 14 and the downstream flange 16 are positioned at opposite ends (e.g., end portions) of the flowmeter body 12 to facilitate coupling the flowmeter body assembly 10 to the adjacent conduits. Thus, a fluid 32 (e.g., water, chemicals, gas, liquid, production fluid, drilling fluid) may flow enter at an upstream end 34 (e.g., end portion) of the flowmeter body 12, flow through the bore 30, and then exit through a downstream end 36 (e.g., end portion) of the flowmeter body 12. As used herein, the terms upstream and downstream are defined with respect to a flow path of the fluid 32. For example, in the illustrated embodiment, the upstream end 34 is upstream from the downstream end 36 because the fluid 32 flows from the upstream end 34 toward the downstream end 36. It should be understood that in certain embodiments the flow path of the fluid 32 may be in an opposite direction.

As shown, the connector 18 and/or one or more of the additional connectors 20, 22 may include a threaded surface 38 (e.g., radially-outer threaded surface or radially-inner threaded surface) to enable a cap or other fastener to be coupled to the threaded surface 38. As shown, the upstream flange 14 and the downstream flange 16 may include a lattice structure 40 (e.g., open cell lattice structure, non-solid structure, or non-continuous structure). The lattice structures 40 may have any of a variety of forms. For example, in the flowmeter body assembly 10 of FIG. 1, the lattice structure 40 includes openings 42 (e.g., through holes) that extend along an axial axis 50 of the flowmeter body assembly 10. To facilitate discussion, the flowmeter body assembly 10 and the components therein may be described with reference to the axial axis or direction 50, a radial axis or direction 52, and/or a circumferential axis or direction 54.

Figure 2:
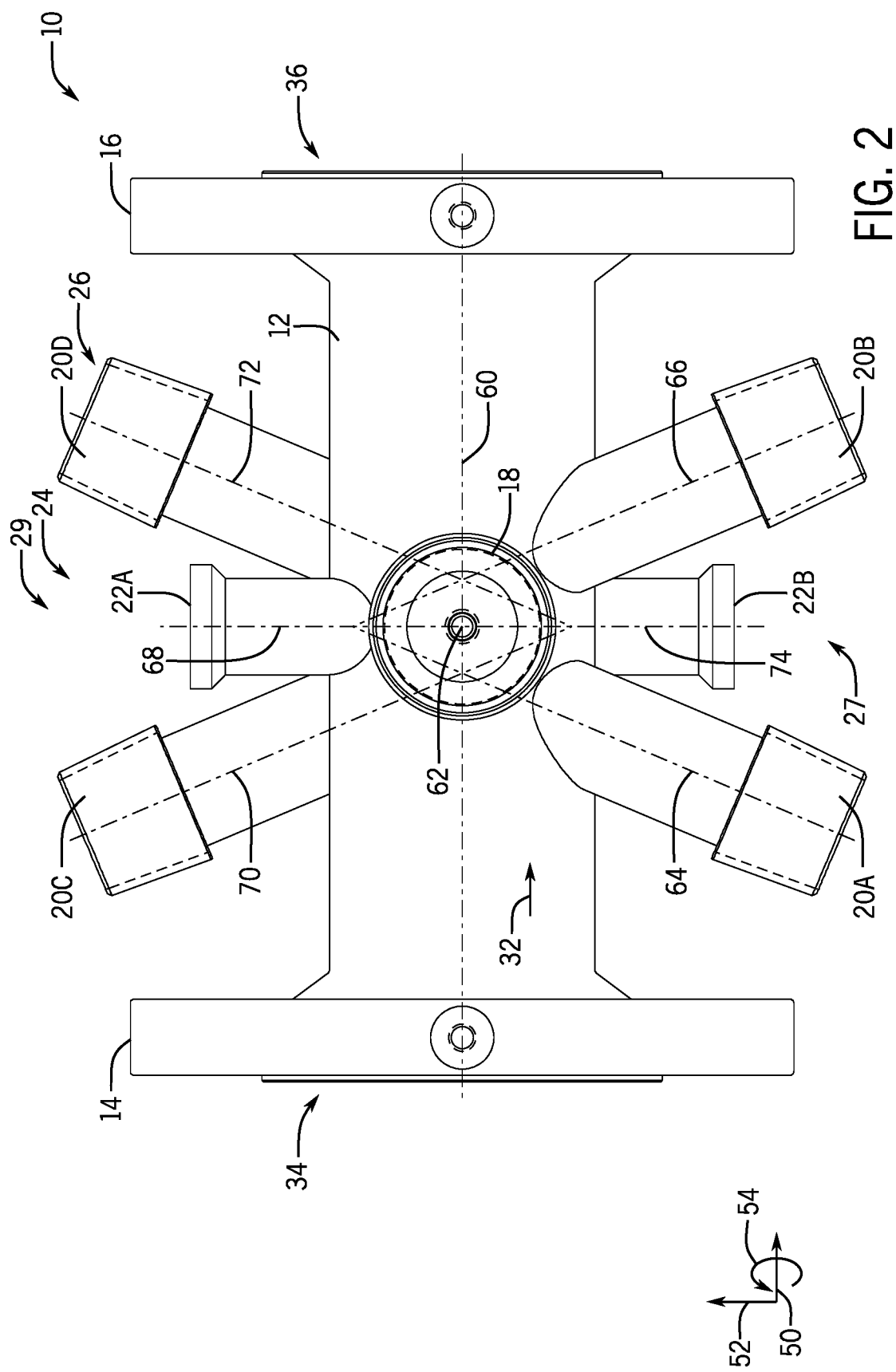
FIG. 2 is a top view of the flowmeter body assembly of FIG. 1, in accordance with an embodiment of the present disclosure.
Figure 3:
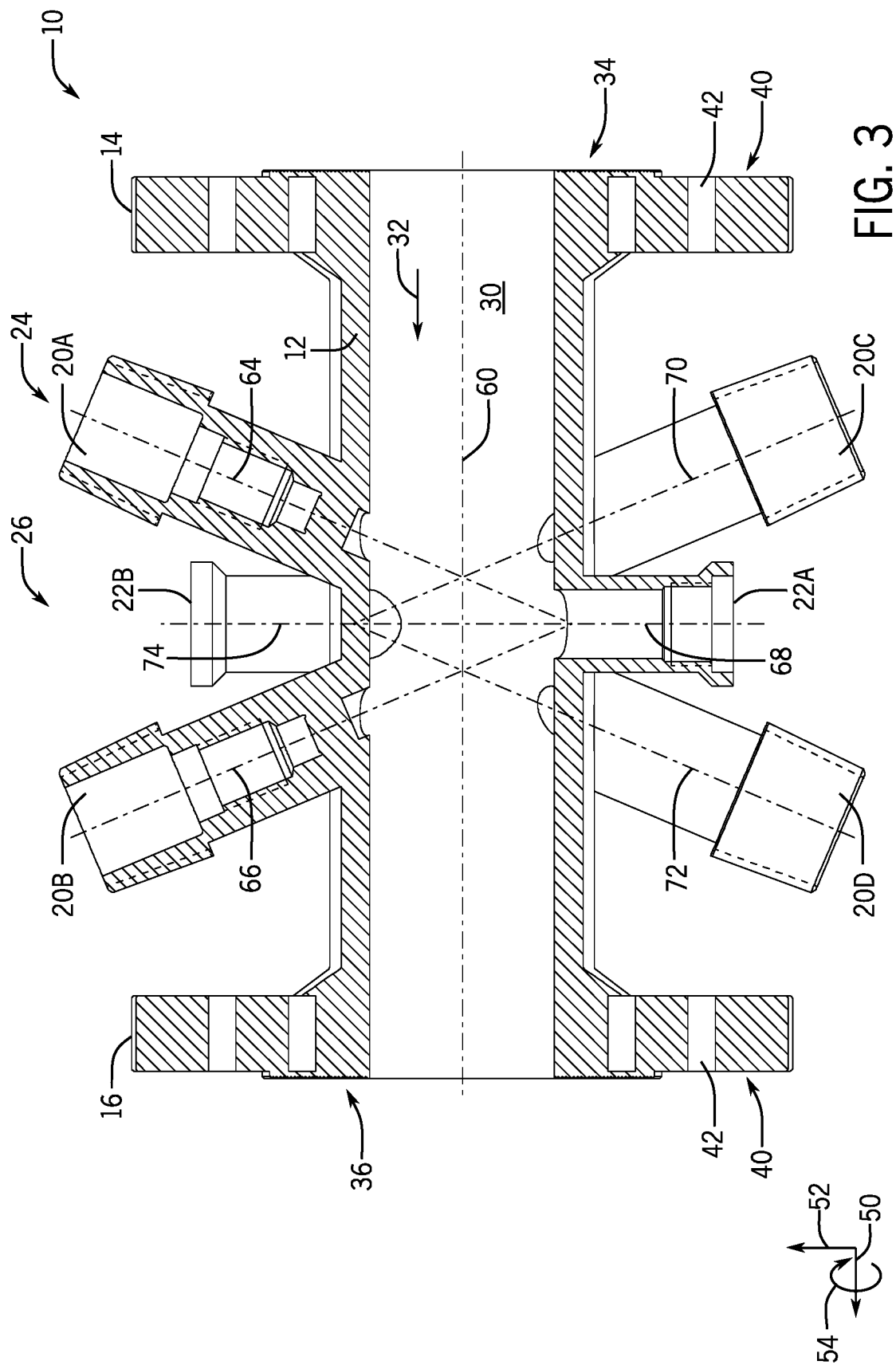
FIG. 3 is a cross-sectional bottom view of the flowmeter body assembly of FIG. 1, in accordance with an embodiment of the present disclosure.
Figure 4:
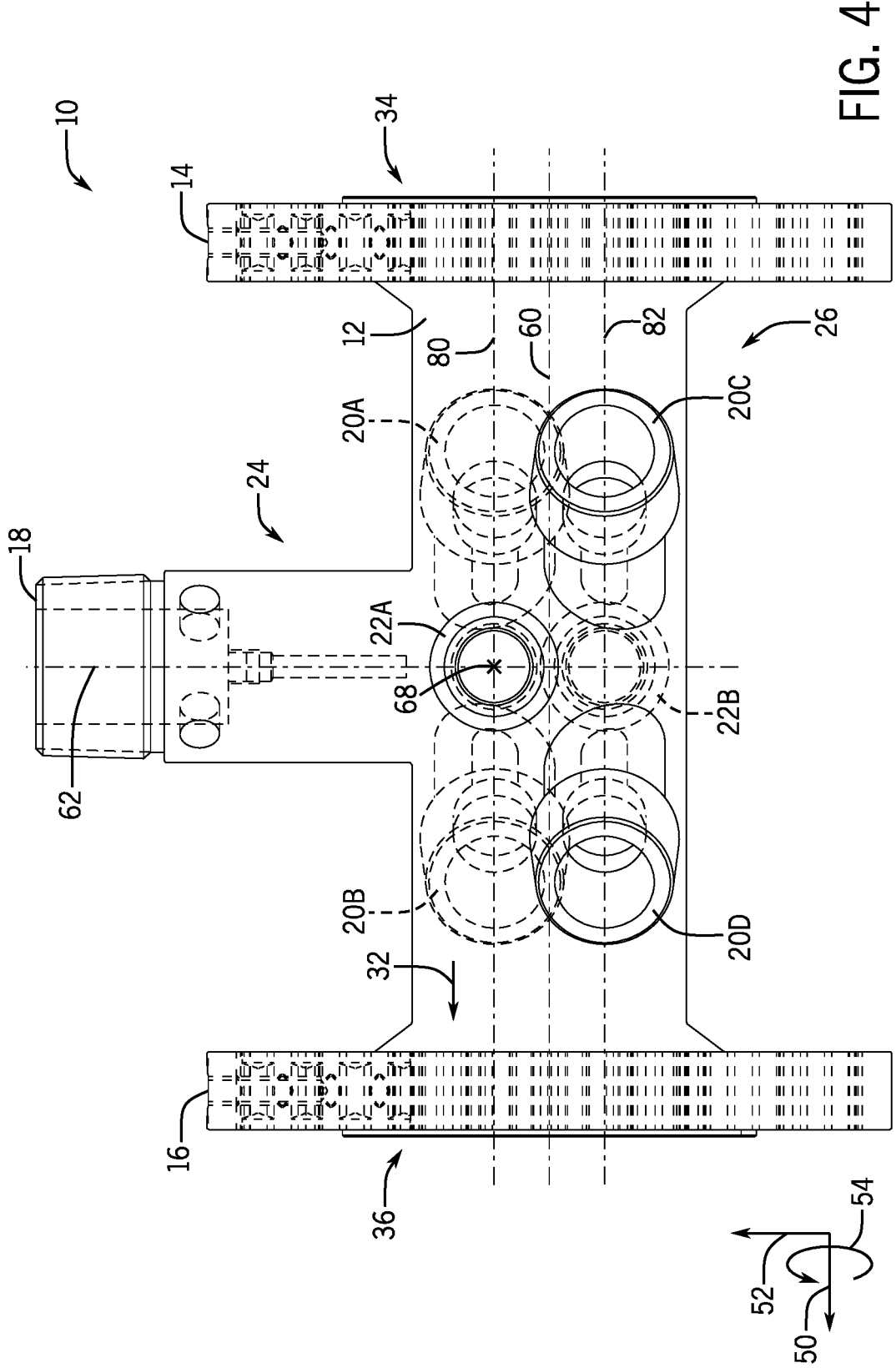
FIG. 4 is a side view of the flowmeter body assembly of FIG. 1, in accordance with an embodiment of the present disclosure.
Figure 5:
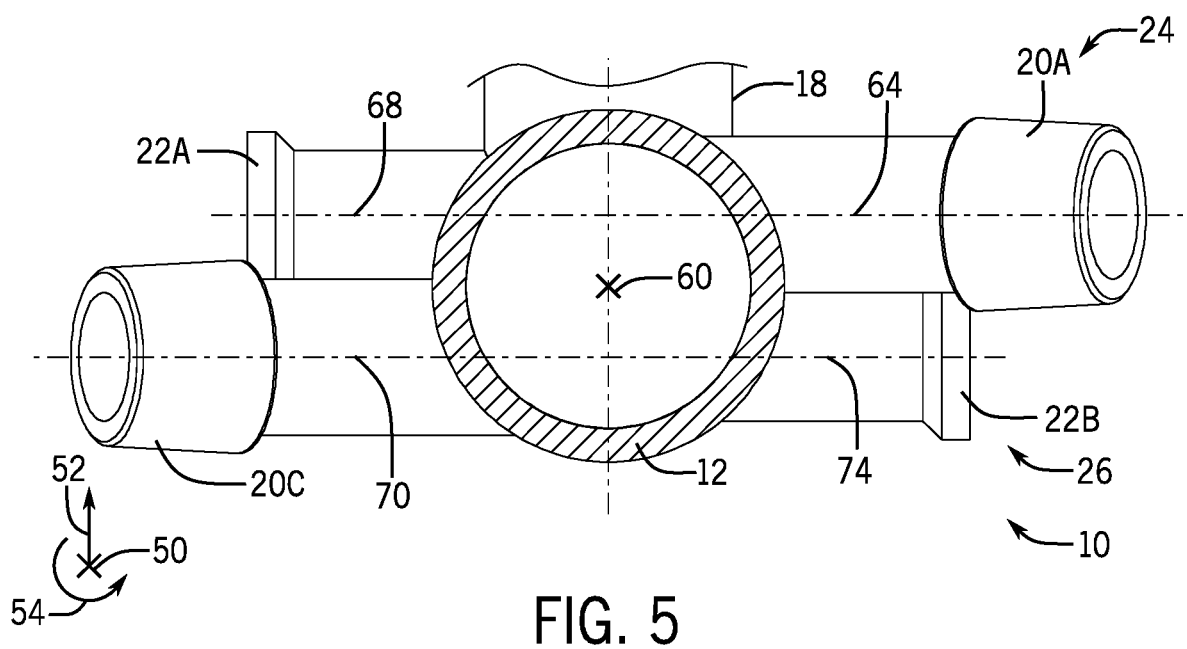
FIG. 5 is a cross-sectional end view of the flowmeter body assembly of FIG. 1, in accordance with an embodiment of the present disclosure.

FIGS. 2-5 illustrate various views of the flowmeter body assembly of 10 of FIG. 1. In particular, FIG. 2 is a top view of the flowmeter body assembly 10, FIG. 3 is a cross-sectional bottom view of the flowmeter body assembly 10, FIG. 4 is a side view of the flowmeter body assembly 10, and FIG. 5 is a cross-sectional end view of the flowmeter body assembly 10. As shown, the flowmeter body 12 has a central axis 60 (e.g., central longitudinal axis) that is parallel to the axial axis 50 of the flowmeter body assembly 10, and the connector 18 has a central axis 62 (e.g., central longitudinal axis) that is parallel to the radial axis 52 and that is perpendicular to the central axis 60 and the axial axis 50. Each additional connector also has a respective central axis (e.g., longitudinal central axis). As shown, the first angular connector 20A has a central axis 64, the second angular connector 20B has a central axis 66, the first radial connector 22A has a central axis 68, the third angular connector 20C has a central axis 70, the fourth angular connector 20D has a central axis 72, and the second radial connector 22B has a central axis 74. The central axes 64, 66, 70, 72 of the angled connectors 20A, 20B, 20C, and 20D, respectively, are angled (e.g., non-parallel) relative to the axial axis 50 and the radial axis 52 of the flowmeter body assembly 10, while the central axes 66, 74 of the radial connectors 22A, 22B, respectively, are parallel to the radial axis 52 and are perpendicular to the central axis 60 and the axial axis 50.

As noted above, the connector 18 may be configured to support a measurement device, such as a transmitter with an electronic controller. Each of the angled connectors 20 may be configured to receive and to support an ultrasonic sensor that is configured to emit and to detect ultrasonic waves, and each of the one or more radial connectors 22 may be configured to support a reflector that is configured to reflect the ultrasonic waves emitted by the ultrasonic sensors. Furthermore, the first angled connector 20A, the second angled connector 20B, and the first radial connector 22A may form the first connector assembly 24 that measures fluid flow in a first chordal plane 80 of the flowmeter body 12, and the third angled connector 20C (shown in FIG. 2), the fourth angled connector 20D, and the second radial connector 22B may form the second connector assembly 26 that measures fluid flow in a second chordal plane 82 of the flowmeter body 12.

To enable such measurements, the first angled connector 20A and the second angled connector 20B may be positioned on a first side 27 of the flowmeter body 12, and the first radial connector 22A may be positioned on a second side 29 of the flowmeter body 12 (e.g., opposite side or separated by a plane extending through the central axis 60 of the flowmeter body 12). Furthermore, as shown, the third angled connector 20C and the fourth angled connector 20D may be positioned on the second side 29 of the flowmeter body 12, and the second radial connector 22B may be positioned on the first side 27 of the flowmeter body 12. Thus, the first angled connector 20A, the second angled connector 20B, and the second radial connector 22B may be positioned on the first side 27, but may be aligned with different chordal planes 80, 82, as shown. Similarly, the third angled connector 20C, the fourth angled connector 20D, and the first radial connector 22A may be positioned on the second side 29, but may be aligned with different chordal planes 80, 82, as shown. It should be appreciated that the number and arrangement of the angled connectors 20 and the radial connectors 22 is merely exemplary, and that any suitable number (e.g., 1, 2, 3, 4, 5, 6, 7, 8, or more) of connectors 20, 22 may be provided in any of a variety of configurations or combinations. Furthermore, any of the connectors 18, 20, 22 may support any of a variety of sensors that are configured to monitor a flow rate of the fluid within the flowmeter body 12.

Each of the first and second connector assemblies 24, 26 may determine the flow rate of the fluid 32 based on a transit time differential. For example, with reference to FIGS. 3 and 4, the ultrasonic sensor positioned in the first angled connector 20A may emit ultrasonic waves in a downstream direction (e.g., with the flow of the fluid 32), and the reflector supported in the first radial connector 22A may reflect the ultrasonic waves toward the ultrasonic sensor positioned in the second angled connector 20B. Additionally, the ultrasonic sensor positioned in the second angled connector 20B may emit ultrasonic waves in an upstream direction (e.g., against the flow of the fluid 32), and the reflector supported in the first radial connector 22A may reflect the ultrasonic waves toward the ultrasonic sensor positioned in the first angled connector 20A. In this manner, the first connector assembly 24 measures a first transit time of the ultrasonic waves in a downstream direction and a second transit time of the ultrasonic waves in an upstream direction, and a difference between the first transit time and the second transit time can be correlated to the flow rate of the fluid 32 through the flowmeter body 12 at the first chordal plane 80 (e.g., by a processor within the transmitter).

Similarly, the ultrasonic sensor positioned in the third angled connector 20C may emit ultrasonic waves in a downstream direction (e.g., with the flow of the fluid 32), and the reflector supported in the second radial connector 22B may reflect the ultrasonic waves toward the ultrasonic sensor positioned in the fourth angled connector 20D. Additionally, the ultrasonic sensor positioned in the fourth angled connector 20C may emit ultrasonic waves in an upstream direction (e.g., against the flow of the fluid 32), and the reflector supported in the second radial connector 22B may reflect the ultrasonic waves toward the ultrasonic sensor positioned in the third angled connector 20C. In this manner, the second connector assembly 26 measures a first transit time of the ultrasonic waves in an upstream direction and a second transit time of the ultrasonic waves in a downstream direction, and a difference between the first transit time and the second transit time can be correlated to the flow rate of the fluid 32 through the flowmeter body 12 at the second chordal plane 82. The flow rates at the first and second chordal planes 80, 82 may be analyzed or combined to determine an overall volumetric flow rate through the flowmeter body 12, as well as enable identification of asymmetric or uneven fluid flow through the flowmeter body 12, for example. Furthermore, as discussed in more detail below, some or all of the components of the flowmeter body assembly 10 may be formed via an additive manufacturing process. Thus, some of all of the components of the flowmeter body assembly 10 shown in FIGS. 1-5 may be formed together as a one-piece structure (e.g., a gaplessly continuous one-piece structure) that is devoid of welded joints.

Figure 6:
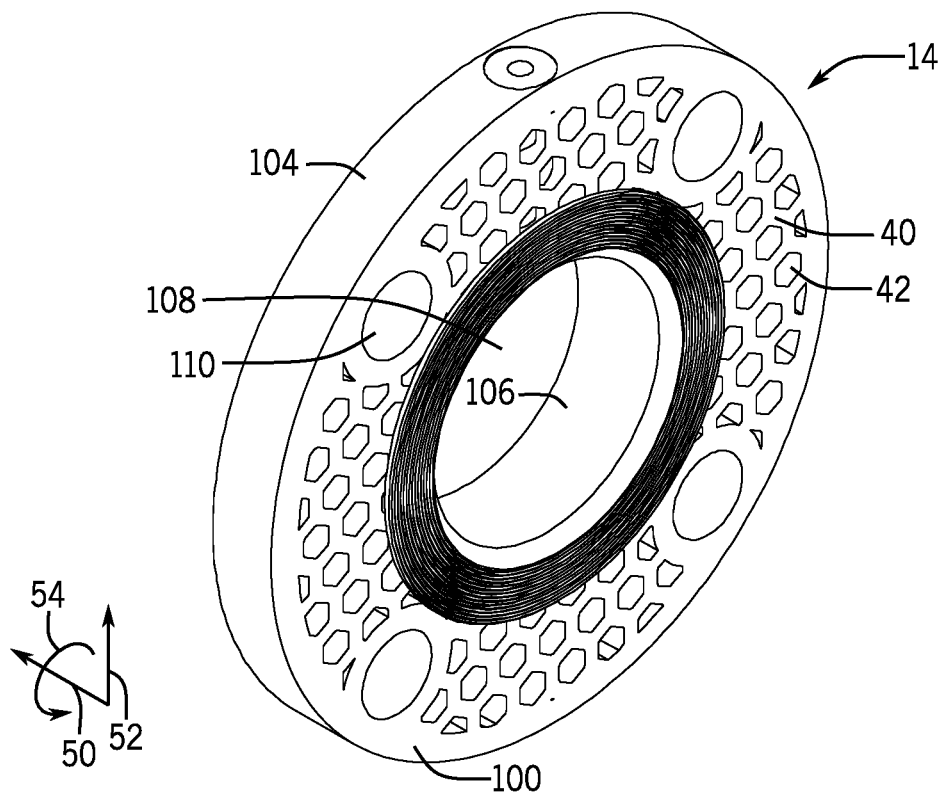
FIG. 6 is a perspective view of one side of a flange that may be used in the flowmeter body assembly of FIG. 1, in accordance with an embodiment of the present disclosure.
Figure 7:
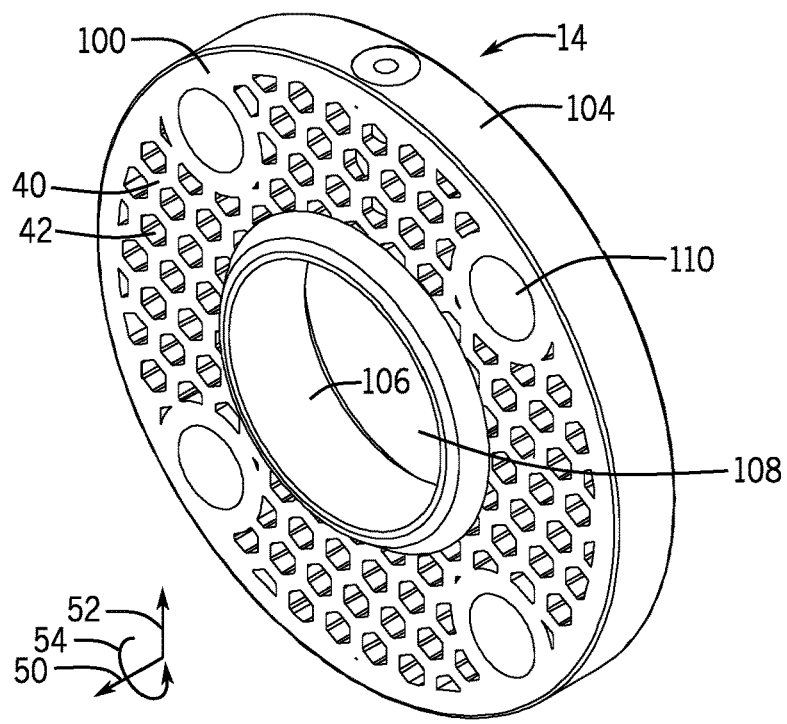
FIG. 7 is a perspective view of another side of the flange of FIG. 6, in accordance with an embodiment of the present disclosure.
Figure 8:
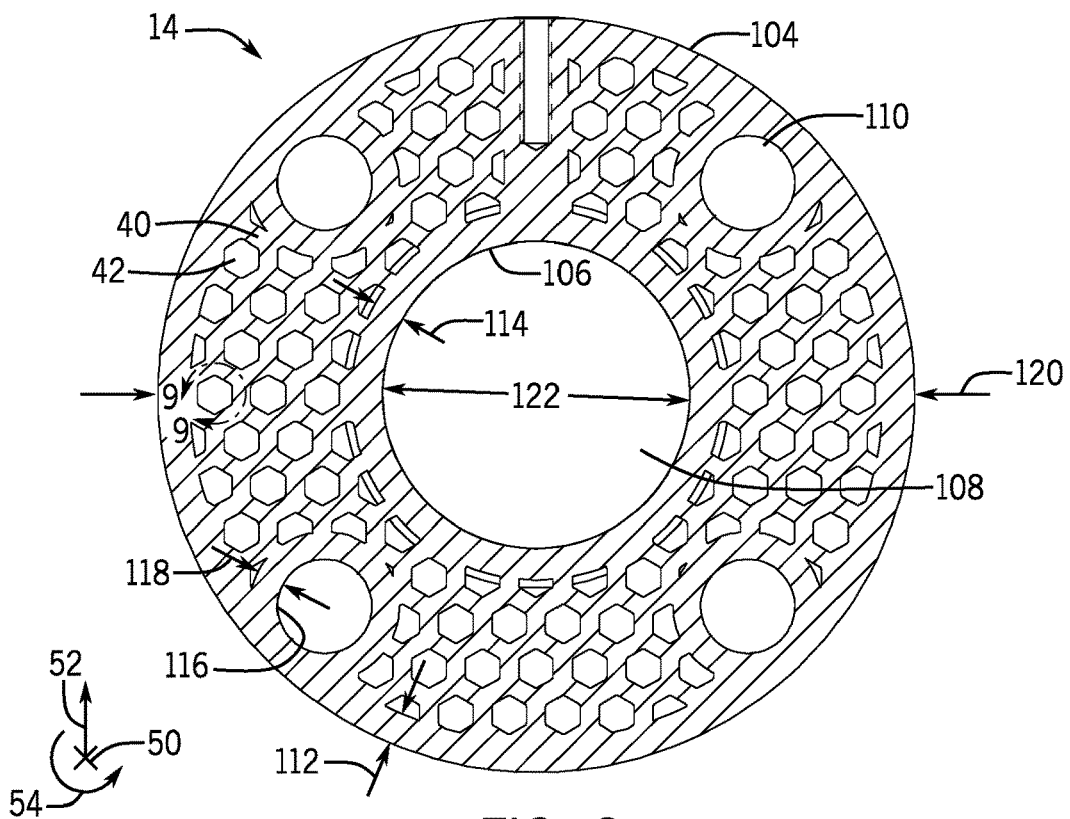
FIG. 8 is a cross-sectional end view of the flange of FIG. 6, in accordance with an embodiment of the present disclosure.
Figure 9:
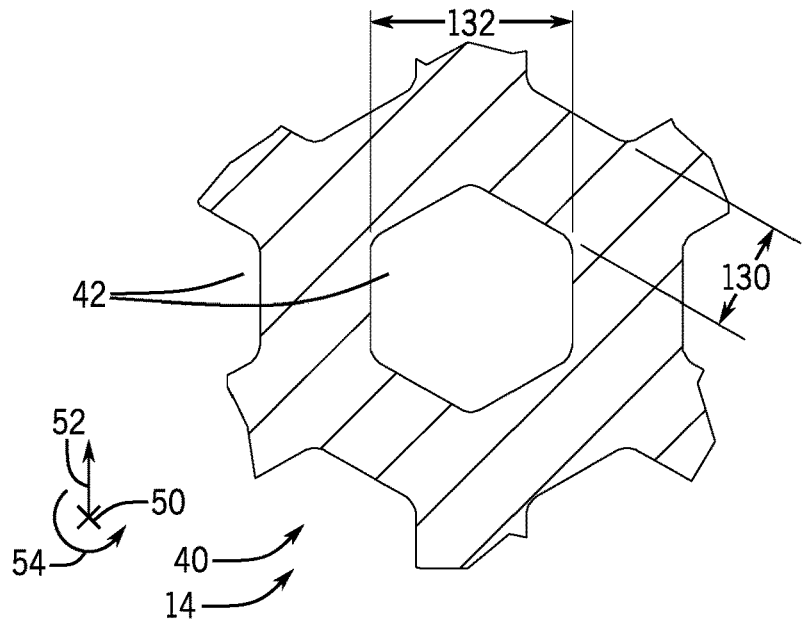
FIG. 9 is a cross-sectional end view of a lattice structure that may be used in the flange of FIG. 6, in accordance with an embodiment of the present disclosure.

FIGS. 6-10 illustrate various views of an embodiment of the upstream flange 14 that may be used in the flowmeter body assembly 10. In particular, FIG. 6 is a perspective view of a first end 100 (e.g., axially-facing surface) of the upstream flange 14, and FIG. 7 is a perspective view of a second end 102 (e.g., axially-facing surface) of the upstream flange 14. Additionally, FIG. 8 is a cross-sectional end view of the upstream flange 14, and FIG. 9 is a cross-sectional end view of the lattice structure 40 that may be used in the upstream flange 14 taken within line 9-9 of FIG. 8.

As shown, the upstream flange 14 is a generally annular cylindrical structure having an outer wall 104 (e.g., solid wall, radially-outer annular wall, cylindrical wall) and an inner wall 106 (e.g., solid wall, radially-inner annular wall, cylindrical wall). The inner wall 106 defines an opening 108 (e.g., bore or through hole) through the upstream flange 14. When the upstream flange 14 is used as part of the flowmeter body assembly 10 (FIGS. 1-5), the opening 108 is aligned with and enables fluid to flow into the bore 30 of the flowmeter body 12.

In the illustrated embodiment, the upstream flange 14 includes multiple openings 110 (e.g., through holes) that are configured to receive fasteners to couple the upstream flange 14 to an adjacent flange. As shown, the upstream flange 14 includes four openings 110 positioned about the circumference of the upstream flange 14; however, any suitable number (e.g., 2, 3, 4, 5, 6, 7, 8, or more) openings 110 may be provided in the upstream flange 14.

In the illustrated embodiment, the upstream flange 14 includes the lattice structure 40. As shown, the lattice structure 40 may be in an interior portion of the upstream flange 14. For example, the lattice structure 40 may be provided between the outer wall 104 and the inner wall 106 of the upstream flange 14. In the illustrated embodiment, at least some of the lattice structure 40 is visible after the construction of the upstream flange 14 is complete. However, in some embodiments, some or all of the lattice structure 40 may not be visible after construction of the upstream flange 14 is complete.

In the illustrated embodiment, the lattice structure 40 includes the openings 42 that extend along the axial axis 50 (e.g., a central longitudinal axis of the openings 42 is parallel to the axial axis 50 of the upstream flange 14). The openings 42 may be through holes that extend axially across the upstream flange 14. For example, at least some of the openings 42 may extend between the first end 100 and the second end 102 and be open at the first end 100 and the second end 102. In the illustrated embodiment, at least some of the openings 42 have a hexagonal cross-sectional shape.

The configurations disclosed herein may reduce the weight of the upstream flange 14 (e.g., by 10, 20, 30, 40, 50 percent or more), while maintaining adequate strength for use in pressure-containing components of a mineral-extraction system or a pipeline system, for example. For example, with reference to FIG. 8, the outer wall 104 may have a thickness 112 (e.g., a radial thickness that is solid and devoid of the lattice structure 40) and the inner wall 106 may have a thickness 114 (e.g., a radial thickness that is solid and devoid of the lattice structure 40). In some embodiments, the thicknesses 112, 114 may be between approximately 1 to 10, 2 to 9, 3 to 8, or 4 to 7 millimeters (mm). As shown, each opening 110 may be defined or surrounded by an opening wall 116 (e.g., annular wall) having a radial thickness 118 (e.g., a radial thickness that is solid and devoid of the lattice structure 40), which may be between approximately 1 to 10, 2 to 9, 3 to 8, or 4 to 7 millimeters (mm). In some embodiments, some or all of the radial thicknesses 112, 114, 118 of the walls 104, 106, 116, respectively, may be equal to or greater than approximately 1, 2, 3, 4, 5, 6, 7, 8, 9, or 10 mm. Furthermore, a maximum diameter 120 of the upstream flange 14 may be between approximately 100 to 200, 135 to 175, or 140 to 160 mm, and/or a diameter 122 of the bore 30 may be between approximately 30 to 100, 40 to 80, or 50 to 70 mm. With reference to FIG. 9, the openings 42 of the lattice structure 40 have a hexagonal cross-sectional shape. As shown, adjacent openings 42 may be separated by a width 130 that is between approximately 1 to 10, 2 to 8, or 3 to 5 mm, and a width 132 of the opening 42 may be between approximately 1 to 10, 3 to 9, or 5 to 8 mm.

The dimensions provided above are intended to be exemplary, and it should be appreciated that the relative dimensions may scale with the overall size of the upstream flange 14 and/or may vary based on the application. For example, the thickness 112 of the outer wall 104, the thickness 114 of the inner wall 106, and/or the thickness 118 of the opening wall 116 may be between approximately 1 to 25, 2 to 20, or 3 to 5 percent of the maximum diameter 120 of the upstream flange 14. In some embodiments, the thickness 112 of the outer wall 104, the thickness 114 of the inner wall 106, and/or the thickness 118 of the opening wall 116 may be equal to or greater than approximately 1, 2, 3, 4, or 5 percent of the maximum diameter 120 of the upstream flange 14. Additionally or alternatively, the width 130 between openings 42 of the lattice structure 40 may be between approximately 1 to 25, 2 to 20, or 3 to 10 percent of the maximum diameter 120 of the upstream flange 14. Additionally or alternatively, the width 132 of the openings 42 of the lattice structure 42 may be between approximately 1 to 10, 2 to 8, or 3 to 5 percent of the maximum diameter 120 of the upstream flange 14. Additionally or alternatively, the width 130 may be may be approximately 10 to 150, 30 to 100, 40 to 80, or 50 to 60 percent of the width 132, for example.

Furthermore, the geometry of the upstream flange 14 and the lattice structure 42 shown in FIGS. 6-9 is merely exemplary. It should be appreciated that the openings 42 may not be through holes and/or may have any of a variety of cross-sectional shapes, such as squares, triangles, rectangles (e.g., non-square), diamonds, pentagons, octagons, or circles. It should be appreciated that the openings 42 may be arranged to have various orientations relative to the axial axis 50.

Figure 10:
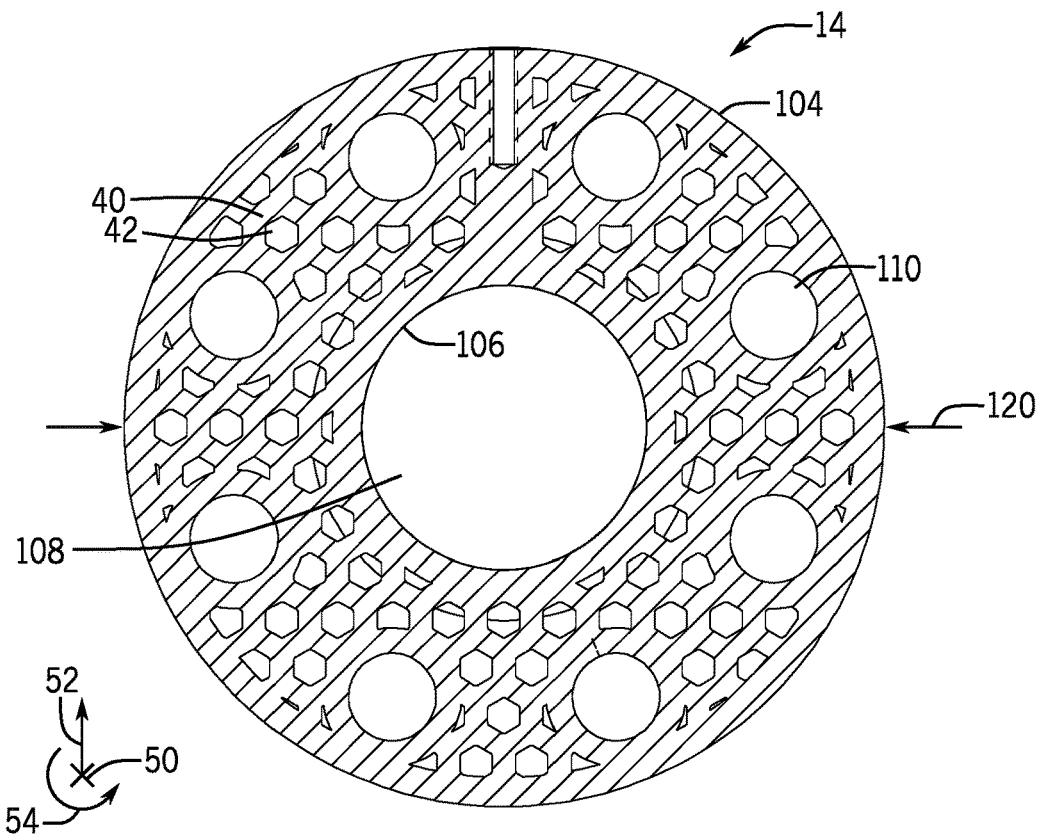
FIG. 10 is a cross-sectional end view of another flange that may be used in the flowmeter of FIG. 1, in accordance with an embodiment of the present disclosure.

Moreover, it should be appreciated that the upstream flange 14 may have various configurations. For example, FIG. 10 is a cross-sectional end view of another embodiment of the upstream flange 14 that may be used in the flowmeter 10. In FIG. 10, the lattice structure 40 has different dimensions (e.g., widths 130, 132) or relative dimensions (e.g., ratio between widths 130, 132; ratio between widths 130, 132 and the maximum diameter 120). It should also be appreciated that the downstream flange 16 may have any of the features illustrated and described with respect to FIGS. 6-10. It should also be appreciated that the flanges (e.g., the flanges 14, 16) disclosed herein may be part of any of a variety of other components, such as valves (e.g., choke valves, ball valves, gate valves), pipe sections, or the like, that utilize flanges to couple to adjacent components.

Figure 11:
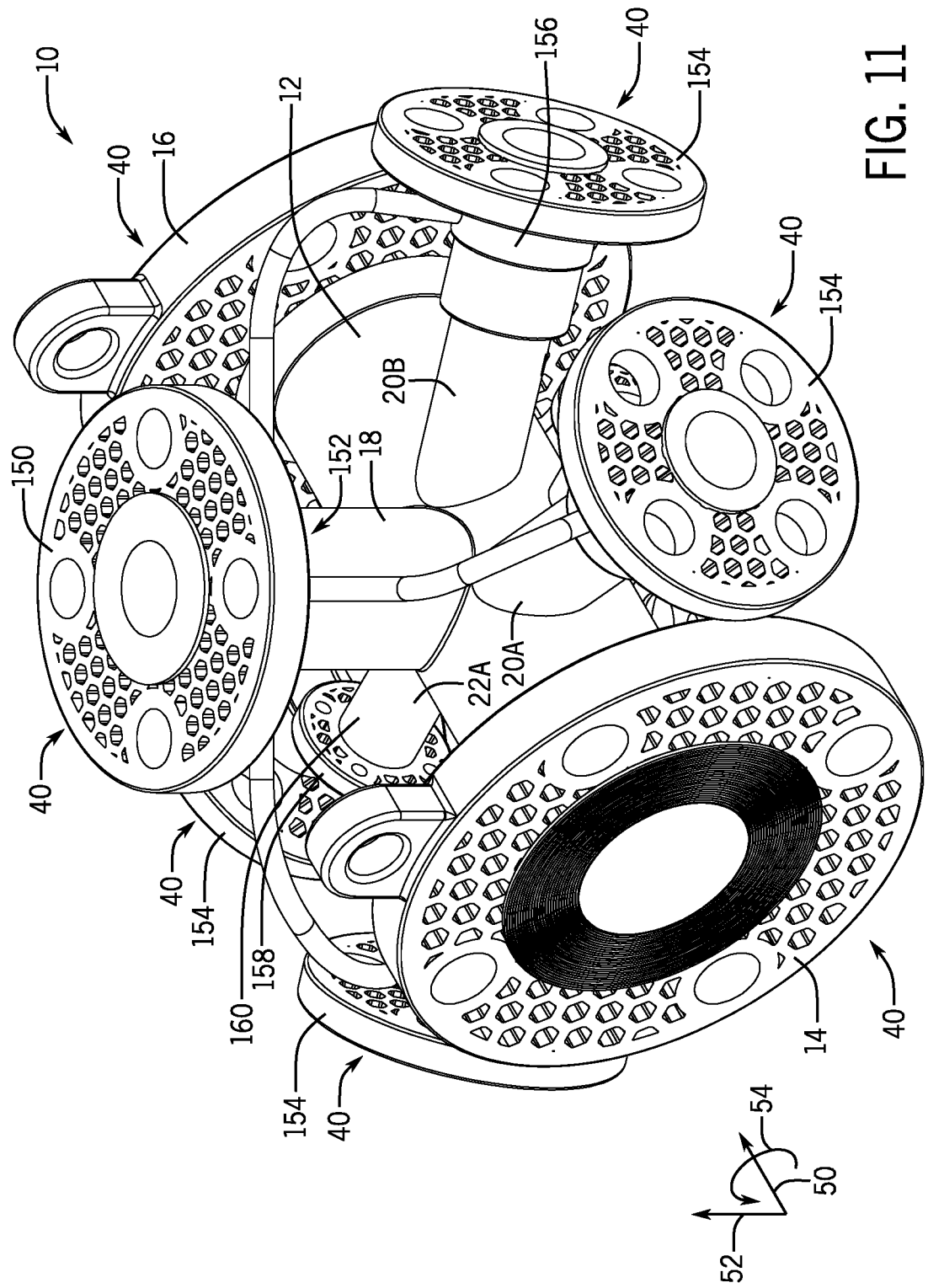
FIG. 11 is a perspective view of a flowmeter body assembly having multiple flanges, in accordance with an embodiment of the present disclosure.
Figure 12:
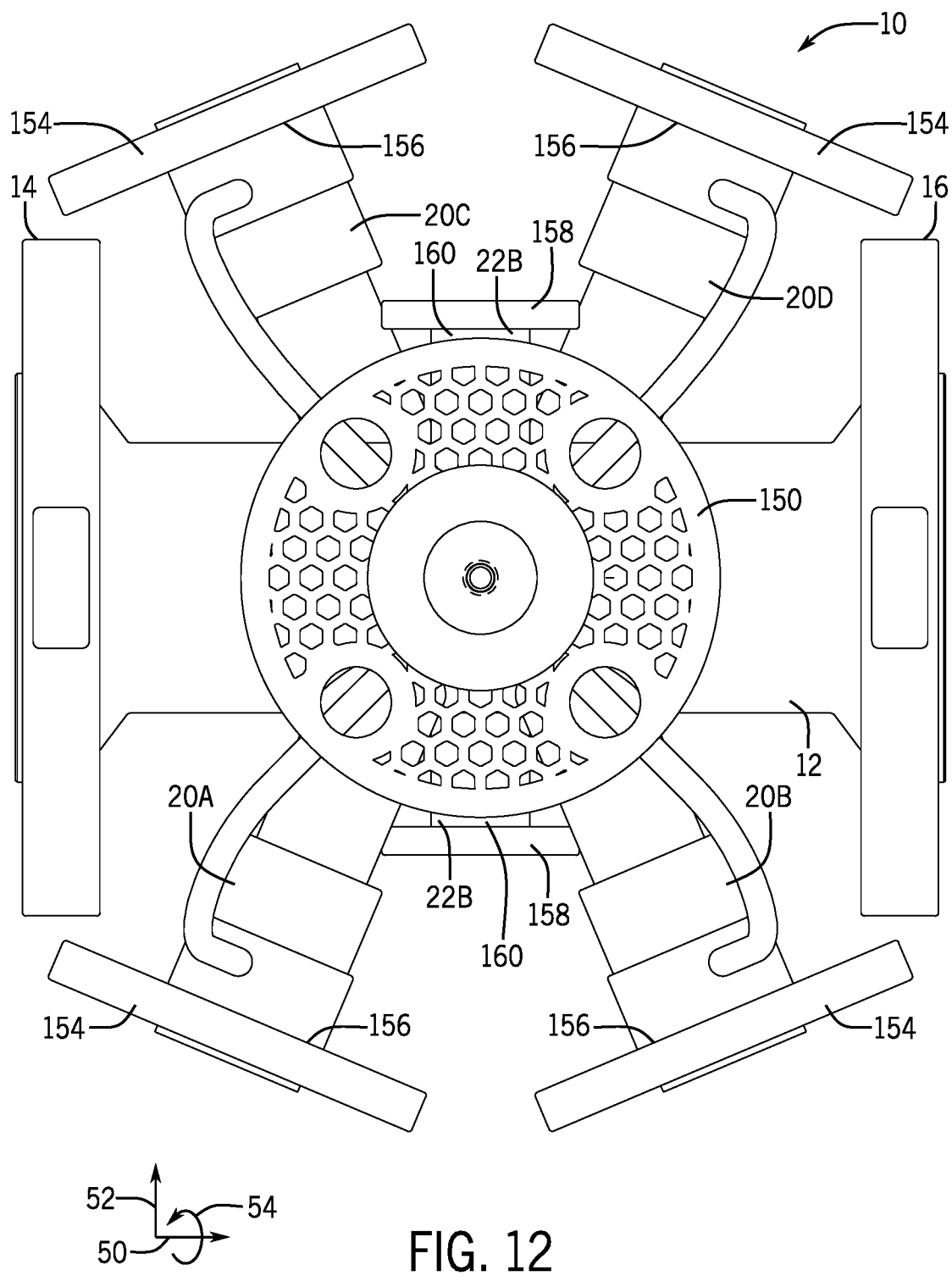
FIG. 12 is a top view of the flowmeter body assembly of FIG. 11, in accordance with an embodiment of the present disclosure.

FIG. 11 illustrates a perspective view and FIG. 12 illustrates a top view of another flowmeter body assembly 10 having multiple flanges, including the upstream flange 14, the downstream flange 16, and a connector flange 150 (e.g., annular flange) positioned at a radially-outer end 152 (e.g., end portion) of the connector 18. The flowmeter body assembly 10 also includes additional connector flanges 154 (e.g., annular flanges) at respective radially-outer ends 156 (e.g., end portions) of each angled connector 20, and additional connector flanges 158 (e.g., annular flanges) at respective radially-outer ends 160 (e.g., end portions) of each radial connector 22.

The connector flange 150 and the additional connector flanges 154, 158 may enable the flowmeter body assembly 10 to be formed without some or all of the threaded surface 38 (FIG. 1). Such threaded surfaces 38 may be formed via machining steps (e.g., after the additive manufacturing process), and thus, the various flanges 150, 154, 156 may reduce the manufacturing time by reducing or eliminating these machining steps, for example.

As shown, some or all of the flanges 150, 154, 158 may include the lattice structure 40, which may have any of the features discussed above with respect to FIGS. 1-10. For example, some or all of the flanges 150, 154, 158 may include the lattice structure 40 having openings 42 that are through holes having a hexagonal cross-sectional shape. Furthermore, some or all of the flanges 150,154, 158 may include respective outer walls, inner walls, and opening walls that are solid or devoid of the lattice structure 40. It should be appreciated that the various flanges 14, 16, 150, 154, 158 may include lattice structures 40 having the same or different configurations (e.g., one flange may include openings 42 having the hexagonal cross-sectional shape and another flange may include openings 42 having a circular cross-sectional shape).

Figure 13:
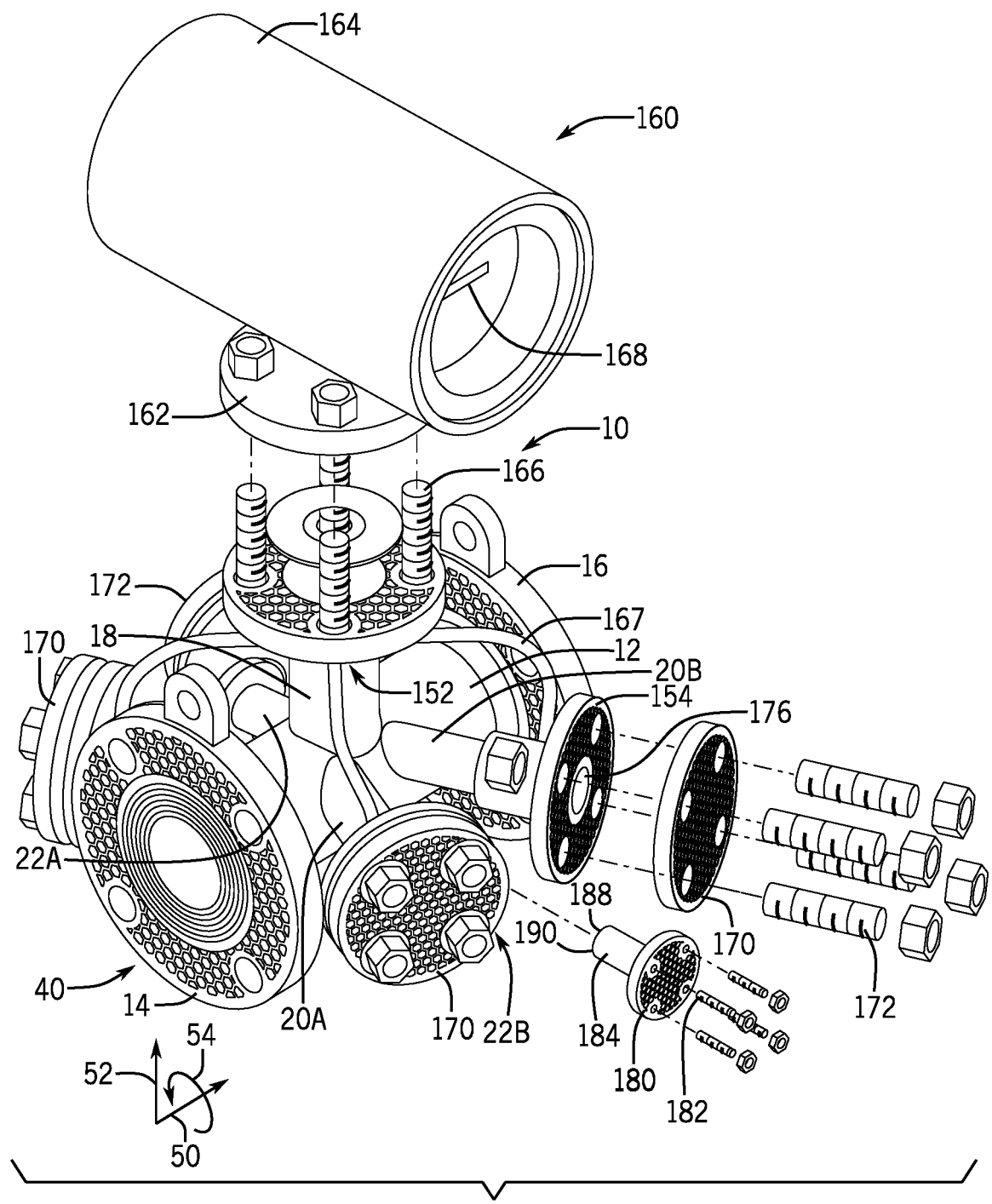
FIG. 13 is an exploded view of a flowmeter having the flowmeter body assembly of FIG. 11, in accordance with an embodiment of the present disclosure.

FIG. 13 is an exploded view of a flowmeter 160 that may be constructed with the flowmeter body assembly 10 of FIGS. 11 and 12. As shown, the flowmeter body assembly 10 includes the flowmeter body 12, the upstream flange 14, the downstream flange 16, the connector 18, the angled connectors 20, and the radial connectors 22. The connector flange 150 is positioned at the radially-outer end 152 of the connector 18 and is configured to couple to a corresponding flange or plate 162 of a measurement device 164 (e.g., transmitter) via fasteners 166 (e.g., threaded fasteners, such as bolts and nuts). In some embodiments, the measurement device 164 is configured to provide control signals to the ultrasonic sensors and to process signals received from the ultrasonic sensors to determine a flow rate of the fluid (e.g., the measurement device 164 includes a processor and a memory, and the processor is configured to execute instructions stored on the memory to provide the control signals and to process signals received from the ultrasonic sensors). In the illustrated embodiment, multiple cables 167 extend between the measurement device 164 and the ultrasonic sensors to enable these techniques. Additionally, the measurement device 164 may include a display 168 (e.g., display screen) that is configured to provide a displayed output indicative of the flow rate of the fluid.

As shown, the additional connector flanges 154 at respective radially-outer ends 156 of each angled connector 20 are configured to couple to corresponding plates 170 (e.g., closure plates or caps) via fasteners 172 (e.g., threaded fasteners, such as bolts and nuts). More particularly, with reference to the angled connector 20B, an ultrasonic sensor 174 may be inserted through an opening 176 (e.g., central opening) in the additional connector flange 154 and into the angled connector 20B (e.g., a bore or space within the angled connector 20B). Once the ultrasonic sensor 174 is properly positioned within the angled connector 20B, the corresponding plate 170 may be coupled to the additional connector flange 154 via the fasteners 172. The corresponding plates 170 may include the lattice structure 42 having any of the features disclosed herein, for example. It should be appreciated that respective ultrasonic sensors may be positioned and enclosed in each of the angled connectors 20 in a similar manner.

Figure 14:
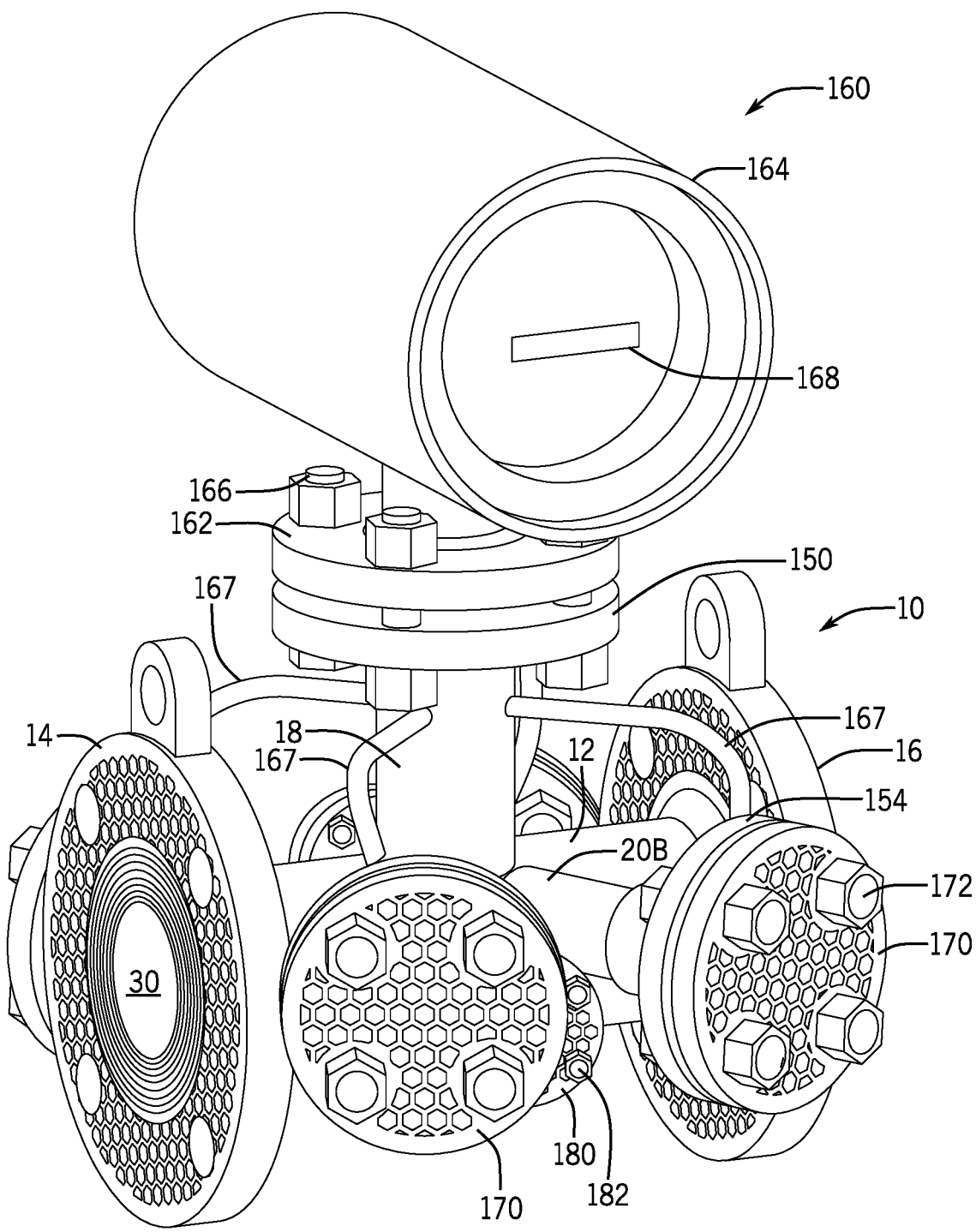
FIG. 14 is a perspective view of the flowmeter of FIG. 13, in accordance with an embodiment of the present disclosure.
Figure 14:
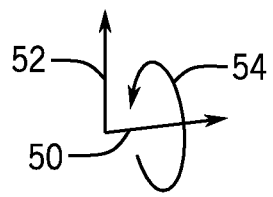

As shown, the additional connector flanges 158 at respective radially-outer ends 160 of each radial connector 22 are configured to couple to corresponding plates 180 (e.g., closure plates, caps, or plugs) via fasteners 182 (e.g., threaded fasteners, such as bolts and nuts). More particularly, with reference to the radial connector 22B (FIG. 12), the corresponding plate 180 includes a plate portion 184 and a plug portion 186 extending from the plate portion 184. A reflector 188 (e.g., flat reflective surface) may be provided at an end 190 (e.g., opposite end from the plate portion 184) of the plug portion 184. Once the plug portion 186 of the corresponding plate 180 is properly positioned within the radial connector 22B, the corresponding plate 180 may be coupled to the additional connector flange 158 via the fasteners 182. It should be appreciated that a respective reflector 188 may be positioned and enclosed in each of the radial connectors 22 in a similar manner. While the plate portion 184 and the plug portion 186 are shown as a one-piece structure, it should be appreciated that these components may be separate pieces or structures that are separately assembled on the flowmeter 160, for example. Some or all of each corresponding plate 180 may include the lattice structure 42 having any of the features disclosed herein, for example. With the foregoing in mind, FIG. 14 illustrates a perspective view of an embodiment of the flowmeter 160 of FIG. 13 in an assembled form.

Figure 15:
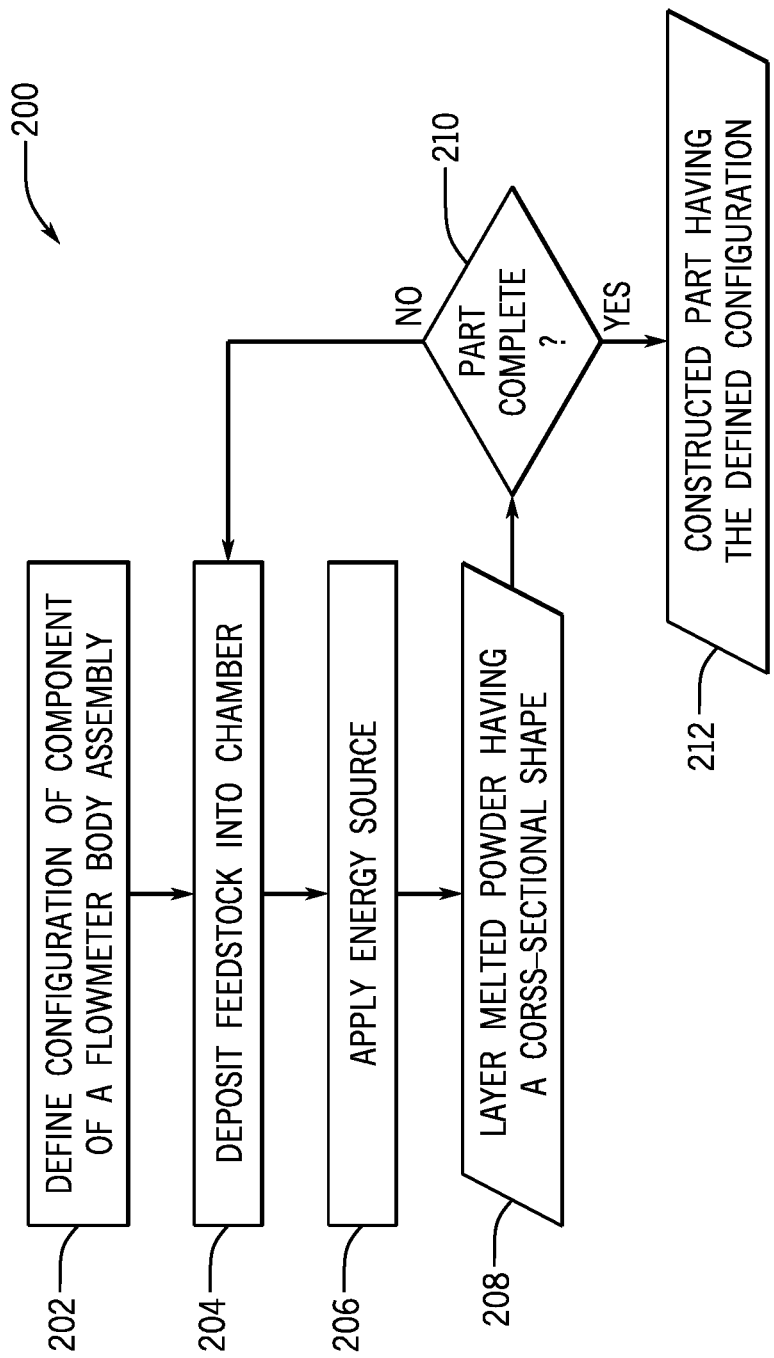
FIG. 15 is a method of manufacturing the flowmeter body assembly of FIG. 1, in accordance with an embodiment of the present disclosure.

FIG. 15 is a flow diagram of a method 200 that may be used to manufacture the flowmeter body assembly 10. The method 200 includes steps for constructing the flowmeter body assembly 10 using an additive manufacturing process (e.g., 3-D printing, such as laser metal deposition). The method 200 may be performed by an additive manufacturing system, which may include a controller (e.g., electronic controller), a processor, a memory device, a user interface, and/or an energy source.

The method 200 includes defining a particular configuration or shape for the flowmeter body assembly 10, in step 202. The configuration may be a computer-generated three-dimensional representation of the flowmeter body assembly 10 and may be programmed by an operator into an additive manufacturing system by using a specialized or general purpose computer having the processor, for example. The defined configuration may have any of the shapes and features described above. For example, the defined configuration for the flowmeter body assembly 10 may include the flowmeter body 12 with the connector 18 and the additional connectors 20, 22 extending radially-outwardly from a sidewall of the flowmeter body 12. In some embodiments, the defined configuration for the flowmeter body assembly 10 may include the flanges 14, 16, which may have the lattice structure 40. In some embodiments, the defined configuration for the flowmeter body assembly 10 may include the connector flange 150 and/or the additional connector flanges 154, 158, which may include the lattice structure 40.

In step 204, feedstock (e.g., a metal powder or wire) is deposited into a chamber, such as a vacuum chamber. Any of a variety of materials may used in any suitable combination, including those described in more detail below. In step 206, an energy source, such a laser or electron beam, is applied to the deposited feedstock to melt or otherwise consolidate the feedstock. As shown at block 208, a consolidated layer having a cross-sectional shape corresponding to the configuration defined in step 202 is formed. The processor or operator may determine whether the flowmeter body assembly 10 is incomplete or complete, in step 210. If the part is incomplete, then steps 204 and 206 are repeated to produce layers of consolidated feedstock having cross-sectional shapes corresponding to the defined confirmation or model until construction of the flowmeter body assembly 10 is complete. Thus, the energy source is applied to melt or otherwise consolidate each newly deposited portion of the feedstock until the final product is complete and the flowmeter body assembly 10 having the defined configuration is produced, as shown in step 212.

The flowmeter body assembly 10 constructed at step 212 via the method 200 may be devoid of welds or welded bonds. The flowmeter body assembly 10 constructed at step 212 via the method 200 may be used in the flowmeter 160 within a mineral extraction system or a pipe system without further processing (e.g., without subsequent machining, smoothing, or heat and pressure treatments, such as hot isostatic pressing) of the flowmeter body assembly. However, in some embodiments, the flowmeter body assembly 10 constructed at step 212 may be machined (e.g., to smooth or to shape various surfaces or to add threaded surfaces 38). Additionally or alternatively, in some embodiments, the flowmeter body assembly 10 may be compacted via a heat and pressure treatment, such as a hot isostatic pressing process. In such cases, the flowmeter body assembly 10 may be positioned within a canister. The flowmeter body assembly 10 produced via the method 200 may have characteristics (e.g., density and/or porosity) that enable the flowmeter body assembly 10 to maintain its shape during the hot isostatic pressing process. The canister may be sealed and vacuumed, and heat and/or pressure is applied to the flowmeter body assembly 10 within the canister via a heat source and/or a pressure source (e.g., an autoclave furnace) to compact the flowmeter body assembly 10 (e.g., further reduce porosity of the flowmeter body assembly 10). In certain embodiments, the temperature applied to the flowmeter body assembly 10 within the canister may be approximately 1050 to 1100 degrees Celsius, and the hydrostatic pressure within the canister may be approximately 400 to 450 MPa. However, any suitable temperature and/or pressure may be utilized to compact the flowmeter body assembly 10.

While the method 200 is described with reference to the flowmeter body assembly 10 to facilitate discussion, it should be appreciated that the method 200 may be adapted to separately manufacture some or all of the components that form the flowmeter body assembly 10 or the flowmeter 160 (e.g., the flowmeter body 12; the connector 18; the additional connectors 20, 22; the flanges 14, 16, 150, 154, 158; the plates 170, 180), and the separately formed components may be subsequently joined together via welding or fasteners (e.g., fasteners 162, 172, 182). For example, the flowmeter body 12, the connector 18, and the additional connectors 20, 22 may be formed as a one-piece structure that is devoid of welds via the method 200. The flanges 14, 16 may be formed separately via the method 200, and then the flanges 14, 16 may be welded to the flowmeter body 12 to form the flowmeter body assembly 10. As another example, the flowmeter body 12, the connector 18, the additional connectors 20, 22, and the flanges 14, 16, 150, 154, 158 may be formed as a one-piece structure that is devoid of welds via the method 200. The plates 170, 180 may be formed separately via the method 200, and then the plates 170, 180 may be joined to the flowmeter body assembly 10 via fasteners 172, 182 to form the flowmeter 160. Constructing components of the flowmeter 160 via the method 200 may enable the components to be manufactured efficiently and/or on-site at the location where the components will be utilized. For example, the components may be manufactured via the method 200 via the additive manufacturing system on an offshore rig of a subsea mineral extraction system.

The flowmeter body assembly 10 disclosed herein may have a reduced weight, while maintaining adequate structural integrity when used in mineral-extraction systems or pipe systems. For example, the flowmeter body assembly 10 may demonstrate stress and plastic strain below allowable limits, thereby providing protection against failures, such as cracks and plastic collapse. The components the flowmeter body assembly 10 may be formed from any of a variety of materials. For example, some or all of the portions of the flowmeter body assembly 10 may be formed from a nickel-based alloy (e.g., Inconel 718) or a stainless steel material (e.g., martensitic precipitation hardened stainless steel, such as 17-4 PH). In some embodiments, some or all of the portions of the flowmeter body assembly 10 may be devoid of any other materials (e.g., the portions only include a nickel-based alloy or a stainless steel material). It should be appreciated that different portions of the flowmeter body assembly 10 may be formed from different materials (e.g., the lattice structure 40 may be formed from a different material than the outer wall 104 and/or the inner wall 106 of the flanges 14, 16). In some embodiments, the flowmeter body assembly 10 may be formed from a material having a yield strength of between approximately 700 and 1000 Newtons per square millimeter (N/mm$^2$) at room temperature.

While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the disclosure as defined by the following appended claims. It should be appreciated that any of the features illustrated in FIGS. 1-15 or disclosed herein may be combined in any combination.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A flowmeter body assembly, comprising:
a flowmeter body;
a fluid passage extending through the flowmeter body; and
a plurality of angled connectors extending from a sidewall of the flowmeter body, wherein the flowmeter body and the plurality of angled connectors form a one-piece structure that is devoid of welded joints, and each of the plurality of angled connectors is configured to support a respective sensor to enable measurement of a flow rate of a fluid across at least one chordal plane of the flowmeter body.

2. The flowmeter body assembly of claim 1, comprising one or more radial connectors, wherein each of the one or more radial connectors is configured to support a reflector.

3. The flowmeter body assembly of claim 2, wherein the plurality of angled connectors comprises a first angled connector, a second angled connector, a third angled connector, and a fourth angled connector, and wherein the one or more radial connectors comprises a first radial connector and a second radial connector.

4. The flowmeter body assembly of claim 3, wherein the first angled connector, the second angled connector, and the first radial connector form a first connector assembly that is configured to measure the flow rate of the fluid across a first chordal plane of the at least one chordal plane, and the third angled connector, the fourth angled connector, and the second radial connector form a second connector assembly that is configured to measure the flow rate of the fluid across a second chordal plane of the at least one chordal plane.

5. The flowmeter body assembly of claim 1, comprising a primary connector extending radially-outwardly from the sidewall of the flowmeter body and configured to support a transmitter.

6. The flowmeter body assembly of claim 1, comprising a flange positioned at an end portion of the flowmeter body, wherein the flange comprises an opening, an inner wall disposed circumferentially about the opening, and a lattice structure disposed circumferentially about the inner wall external from the fluid passage through the flowmeter body assembly, wherein the opening is fluidly coupled to the fluid passage.

7. The flowmeter body assembly of claim 6, wherein the one-piece structure comprises the flange, the flowmeter body, and the plurality of angled connectors.

8. The flowmeter body assembly of claim 6, wherein the lattice structure comprises through holes.

9. The flowmeter body assembly of claim 1, comprising a flange positioned at a radially-outer end portion of one angled connector of the plurality of angled connectors.

10. The flowmeter body of claim 9, wherein the flange comprises an opening, an inner wall disposed circumferentially about the opening, and a lattice structure disposed circumferentially about the inner wall external from the fluid passage through the flowmeter body assembly.

11. A method of manufacturing a flowmeter body assembly for use within a flowmeter, the method comprising:
    defining a configuration for the flowmeter body assembly, wherein the configuration comprises a flowmeter body, a plurality of connectors extending from a sidewall of the flowmeter body, and a flange comprising a lattice structure;
    depositing a feedstock into a chamber;
    applying an energy source to the deposited feedstock; and
    consolidating the feedstock into a layer according to the defined configuration.

12. The method of claim 11, wherein the feedstock comprises a nickel-based alloy material or a stainless steel material.

13. The method of claim 11, wherein the flange is positioned at a radially-outer end portion of one connector of the plurality of connectors.

14. The method of claim 12, wherein the flange is positioned at an upstream end portion of the flowmeter body.

15. A flowmeter body assembly, comprising:
    a flowmeter body;
    a plurality of connectors extending from a sidewall of the flowmeter body; and
    a flange comprising an opening, an inner wall disposed circumferentially about the opening, an outer wall disposed circumferentially about the inner wall, and a lattice structure extending between the outer wall and the inner wall external from a fluid passage through the flowmeter body assembly.

16. The flowmeter body assembly of claim 15, wherein the lattice structure comprises through holes.

17. The flowmeter body assembly of claim 15, wherein the lattice structure comprises a hexagonal lattice structure.

18. The flowmeter body assembly of claim 15, wherein the flange is positioned at a radially-outer end portion of one connector of the plurality of connectors.

19. The flowmeter body assembly of claim 15, wherein the flange is positioned at an end portion of the flowmeter body, and the opening is fluidly coupled to the fluid passage.

20. The flowmeter body assembly of claim 15, wherein the plurality of connectors comprises at least one angled connector configured to support an ultrasonic sensor to enable measurement of a flow rate of a fluid across at least one chordal plane of the flowmeter body.

* * * * *